United States Patent
Choi et al.

(10) Patent No.: US 7,092,334 B2
(45) Date of Patent: Aug. 15, 2006

(54) METHOD OF DETECTING A DEFECT AREA OF A DISK

(75) Inventors: Young Do Choi, Kyunggi-do (KR); Keuk Young Bang, Kyunggi-do (KR); Cheol Jin, Kyunggi-do (KR)

(73) Assignee: Hitachi-LG Data Storage Korea, Inc., Seoul (KR)

( * ) Notice: Subject to any disclaimer, the term of this patent is extended or adjusted under 35 U.S.C. 154(b) by 687 days.

(21) Appl. No.: 10/095,699

(22) Filed: Mar. 13, 2002

(65) Prior Publication Data
US 2002/0163326 A1 Nov. 7, 2002

(30) Foreign Application Priority Data
Apr. 12, 2001 (KR) .............................. 2001-19673
Oct. 5, 2001 (KR) .............................. 2001-61542

(51) Int. Cl.
*G11B 7/095* (2006.01)

(52) U.S. Cl. .............................. 369/53.16; 369/53.17; 369/53.15; 369/47.14

(58) Field of Classification Search ............. 369/53.15, 369/47.14, 53.16, 53.17
See application file for complete search history.

(56) References Cited

U.S. PATENT DOCUMENTS

| | | | | |
|---|---|---|---|---|
| 6,463,021 B1 * | 10/2002 | Nakane et al. | ........... | 369/53.15 |
| 6,483,790 B1 * | 11/2002 | Nakane et al. | ........... | 369/53.17 |
| 6,621,782 B1 * | 9/2003 | Nakane et al. | ............. | 369/53.1 |
| 2001/0021148 A1 * | 9/2001 | Yokoyama et al. | ...... | 369/44.32 |
| 2001/0055247 A1 * | 12/2001 | Tateishi et al. | ........... | 369/44.32 |
| 2002/0027852 A1 * | 3/2002 | Nakane et al. | ........... | 369/53.17 |
| 2004/0233805 A1 * | 11/2004 | Yoshida et al. | .......... | 369/47.14 |

\* cited by examiner

*Primary Examiner*—William Korzuch
*Assistant Examiner*—Adam R. Giesy
(74) *Attorney, Agent, or Firm*—Birch, Stewart, Kolasch & Birch, LLP

(57) ABSTRACT

The present invention relates to a method of detecting a defect area without any mistake during data recording on a writable disk. This method detects a level of a servo error signal produced during a recording operation, checks whether the servo error signal is in an abnormal state based on the detected level, detects a periodic wobble signal or periodicity of the abnormal state occurrences of the servo error signal produced during the recording operation, and determines whether a recording area is in defect based on successful decoding of the detected periodic wobble signal or the periodicity of the abnormal state occurrences if the servo error signal is in an abnormal state. This method ensures exact detection of a defect area, whereby unnecessary speed reduction can be eliminated and successful data writing can be also guaranteed even in a defect area.

10 Claims, 5 Drawing Sheets

METHOD OF DETECTING A DEFECT AREA OF A DISK

BACKGROUND OF THE INVENTION

1. Field of the Invention

The present invention relates to a method of detecting a defect area of a disk without mistakes during data recording on a writable disk.

2. Description of the Related Art

A physical damage such as scratch etc. has an effect on a few or some physical tracks. Especially, a center area of a defect zone has the worst effect on data recording.

If a high-speed data writing is tried at a center area of such a defect zone, a tracking servo control might be terminated so that a recording operation would be interrupted abruptly. In the case that a recording operation is abnormally ended, it is impossible to resume data recording from the abnormally-ended recording position, therefore, data recording must be re-started from the beginning inevitably. However, because a once-writable disk, namely, a CD-R can not be rewritable, it is obliged to be thrown away.

For resolving this problem, various methods are being developed. Almost of the various methods aim at successful data recording even in a defect area by detecting a defect area and reducing recording speed at the detected defect area. One of the various methods uses level of a tracking error (TE) signal.

In the method using level of a TE signal, the level of a TE signal is always being monitored while data is recorded on a writable disk at a predetermined recording speed, and if the monitored level is greater than a preset limit level a current recording area is regarded as defect. In other words, if the TE signal looks unstable a current recording area is regarded as defect so that a current recording speed is decreased to adequate one. After speed reduction, recording operation is proceeded.

However, the TE signal may be unstable instantaneously due to a mechanical shock or disturbance from the outside, therefore, if only level of the TE signal is used in determination of a defect area, a normal recording area may be mistakenly regarded as defect, which leads unnecessary writing speed reduction.

SUMMARY OF THE INVENTION

It is an object of the present invention to provide a method of detecting a defect area of a writable disk more exactly in order to ensure successful data writing on a defect area through timely recording speed reduction.

A method of detecting a defect area of a disk exactly in accordance with the present invention detects a level of a servo error signal produced during a recording operation, checks whether the servo error signal is in an abnormal state based on the detected level, detects a periodic wobble signal or periodicity of the abnormal state occurrences of the servo error signal produced during the recording operation, and determines whether a recording area is in defect based on successful decoding of the detected periodic wobble signal or the periodicity of the abnormal state occurrences if the servo error signal is in an abnormal state.

BRIEF DESCRIPTION OF THE DRAWINGS

The accompanying drawings, which are included to provide a further understanding of the present invention, illustrate the preferred embodiments of the invention, and together with the description, serve to explain the principles of the present invention, and wherein:

FIG. 1 is a block diagram of a disk drive which a method of detecting a defect area of a writable disk in accordance with the present invention is embedded in;

DETAILED DESCRIPTION OF THE PREFERRED EMBODIMENT

In order that the invention may be fully understood, a preferred embodiment thereof will now be described with reference to the accompanying drawings.

Figure 1:
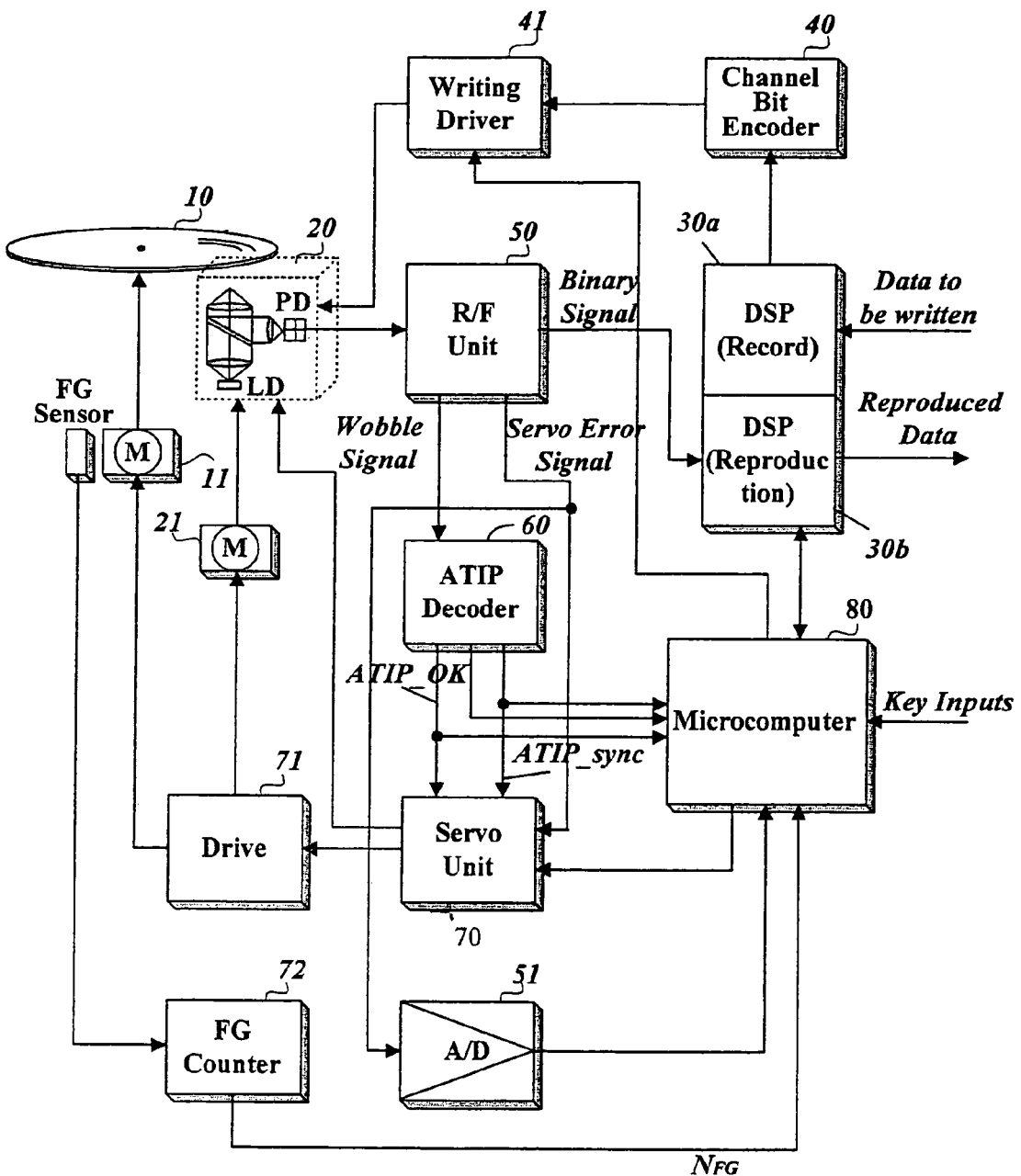

FIG. 1 is a block diagram of a disk drive which a method of detecting a defect area of a writable disk in accordance with the present invention is embedded in.

The disk drive of FIG. 1 comprises a digital recording signal processor 30a for converting input data into recording-formatted data as adding additional data such as an error correction code (ECC); a channel bit encoder 40 for converting the recording-formatted data into a PWM (Pulse Width Modulation) signal; a writing driver 41 for yielding a writing current according to the PWM signal; an optical pickup 20 for writing signals corresponding to the writing current onto a writable disk 10 and reproducing written signals from the writable disk 10; an R/F unit 50 for yielding servo error signals TE and FE (Focusing Error) and binary data signals through combining the reproduced signals from the disk 10, and for producing a wobble signal from longitudinal shape of a spiral track; an A/D converter 51 digitizing the TE signal (and/or FE signal) from the R/F unit 50; a digital reproducing signal processor 30b for restoring original data from the binary data signals using an internal clock synchronized with the binary signals; an ATIP (Absolute Time In Pre-Groove) decoder 60 for decoding the produced wobble signal to extract ATIP data and to output a state signal thereof; a driving unit 71 for driving a spindle motor 11 and a sled motor 21; a servo unit 70 for controlling the driving unit 71 and an actuator of the pickup 20 based on the servo error signals; a FG counter 72 for counting FG pulses outputted in proportion to rotation speed of the spindle motor 11; and a microcomputer 80 for determining whether or not a current recording position is in defect and adjusting recording speed based on result of the determination.

Figure 2:
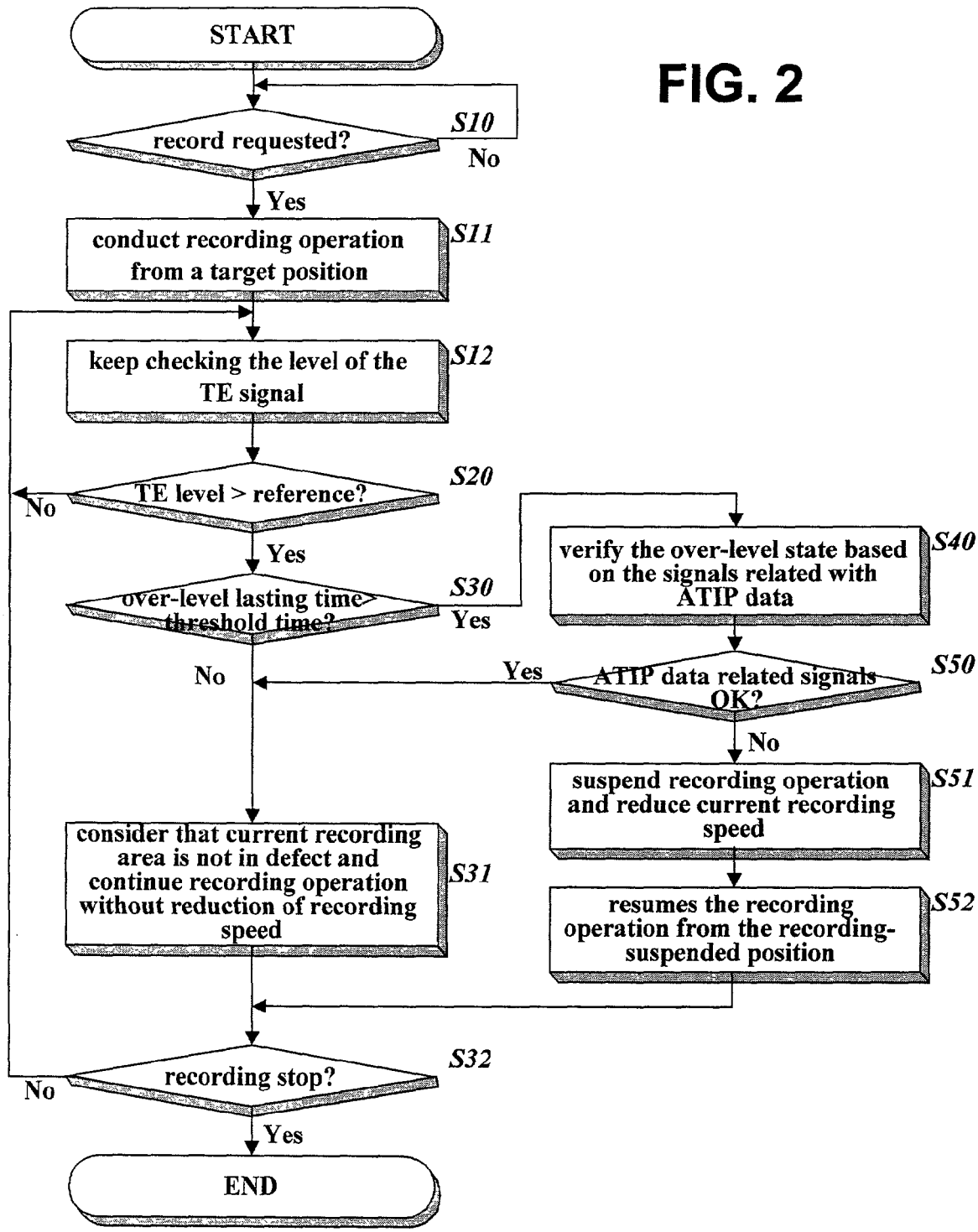
FIG. 2 is a flow chart of an embodiment of a defect area detecting method of the present invention.

FIG. 2 is a flow chart of an embodiment of a defect area detecting method of the present invention. The procedure of FIG. 2 conducted by the disk drive of FIG. 1 is explained below in detail.

If a data recording is requested to the microcomputer 80 from a connected external host (S10) after the writable disk 10 is placed on a tray (not figured) equipped in the disk drive, the microcomputer 80 drives the spindle motor 11 to rotate at a predetermined high speed through the servo unit 70 and the driving unit 71. When the writable disk 10 rotates at the high speed, the microcomputer 80 moves the optical pickup 20 to a target position on the writable disk 10. At the target position, a recording operation is conducted (S11) as follows.

Input data is encoded and then added with parities for improving reproduction reliability by the digital recording signal processor 30a. The encoded data with parities constitutes an ECC block. The channel bit encoder 40 converts bit stream contained in an ECC block from the digital recording signal processor 30a to a corresponding PWM signal suitable for writing on the writable disk 10. The PWM signal is applied to the writing driver 41 which outputs a writing current whose magnitude is already set to an optimal value, which was detected by an OPC (Optimal Power Calibration) operation, by the microcomputer 80.

A laser beam whose intensity is proportional to the writing current is incident to the writable disk 10 by the optical pickup 20, so that the input data is written on a program area of the writable disk 10. At this time, the level and/or duration of a writing pulse is controlled in the writing driver 41 as defined in a write strategy commanded from the microcomputer 80.

Figure 3:
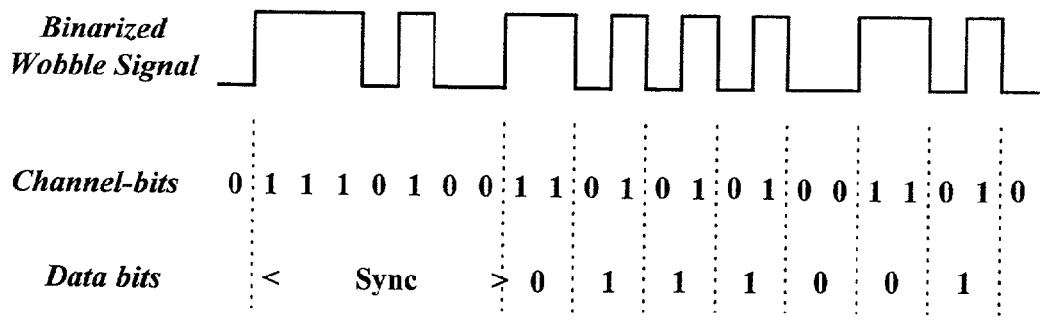
FIG. 3 shows an example of a wobble signal modulated into a wobble track and data encoded in the wobble signal.

While the above-explained recording operation is being conducted, the A/D converter 51 digitizes the TE signal (and/or FE signal) outputted from the R/F unit 50 and the ATIP decoder 60 decodes the wobble signal from the R/F unit 50. As a result of the decoding, ATIP data, which has been encoded like as depicted in FIG. 3, is outputted from the ATIP decoder 60. Besides the ATIP data, the ATIP decoder 60 produces 'ATIP_OK' signal if the decoding of the wobble signal is successful and 'ATIP_sync' signal if an ATIP sync data is detected periodically. The 'ATIP_OK' and the 'ATIP_sync' signal are transmitted to the servo unit 70 as well as the microcomputer 80 whereas the ATIP data is to only the microcomputer 80.

In the meantime, the microcomputer 80 keeps checking the level of the TE signal based on the digitized data (S12) to know whether the level is above a limit level, e.g., 600 [mV] or not. If above the limit level (S20), the microcomputer 80 starts to measure how long the over-level state lasts.

For the measurement, the microcomputer 80 memorizes a FG pulse count value NFG of the counter 72 first at the moment when the level of TE signal exceeds the limit level, and then, continues to check how much the count value NFG is increased from the memorized one. Namely, the microcomputer 80 continues to calculate the difference between current count value and the memorized one and to check whether the difference reaches to a threshold time which may be corresponding to a pre-specified rotation angle at a given recording speed.

Figure 4:
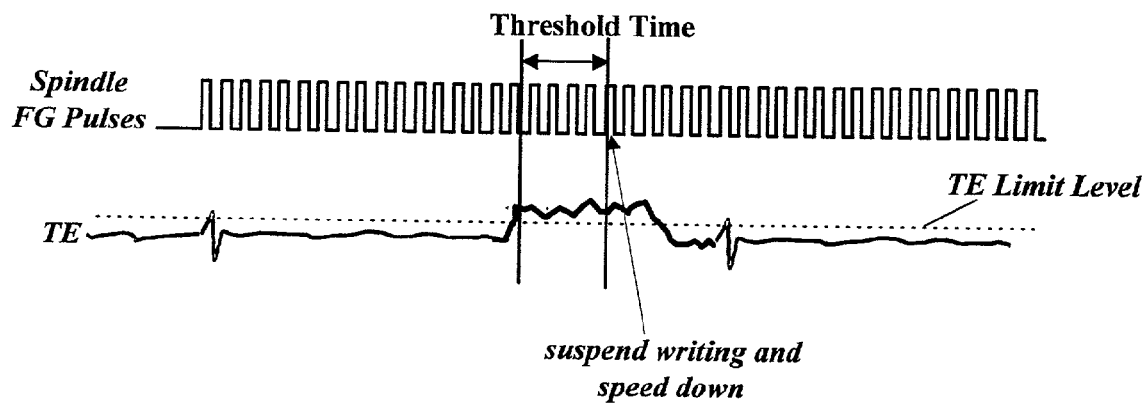
FIG. 4 shows an illustrative abnormal state of a tracking error signal.

Supposing that the given threshold time (rotation angle) is corresponding to one FG pulse, namely, one increment in count value, the microcomputer 80 checks whether the current value counted by the FG counter 72 becomes 'the memorized one +1' while the over-level state is still maintained. If the level of TE signal has been above the limit level for the threshold time (S30) as shown illustratively in FIG. 4, the microcomputer 80 verifies the over-level state, which means unstable recording state, based on the signals related with ATIP data inputted from the ATIP decoder 60 (S40).

If successfully-decoded ATIP data is not received for a while or the ATIP_sync signal is not received (S50), the microcomputer 80 considers that this unstable recording state is caused from a defect of current recording area, thus it conducts a buffer underrun preventing function, requests stop of data transmission to the external host, and suspends data recording temporarily.

After that, the microcomputer 80 reduces current recording speed adequately through the servo unit 70 and the driving unit 71 (S51) and it moves the pickup 20 to the record-suspended point and resumes the recording operation at that point (S52).

Figure 5:
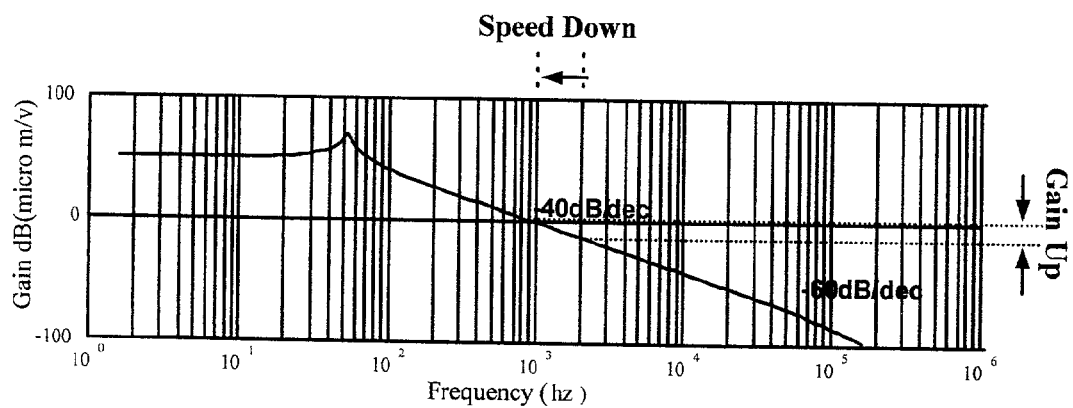
FIG. 5 is a gain characteristic of a servo loop.

If the recording speed is reduced, the TE signal has lower frequency band proportionally. If the frequency of TE signal is made down, a servo gain is increased as shown in servo-loop gain characteristic of FIG. 5. A high-gain servo loop can make good tracking for severe changes of recording conditions. The above-explained defect area detecting and record controlling operation continues until recording is ended (S32).

If the over-level state lasting time is shorter than the threshold time or if ATIP data is still decoded successfully even though the over-level state lasts beyond the threshold time, the microcomputer 80 considers that current recording area is not in defect, therefore, it continues recording operation without reduction of recording speed (S31).

Figure 6:
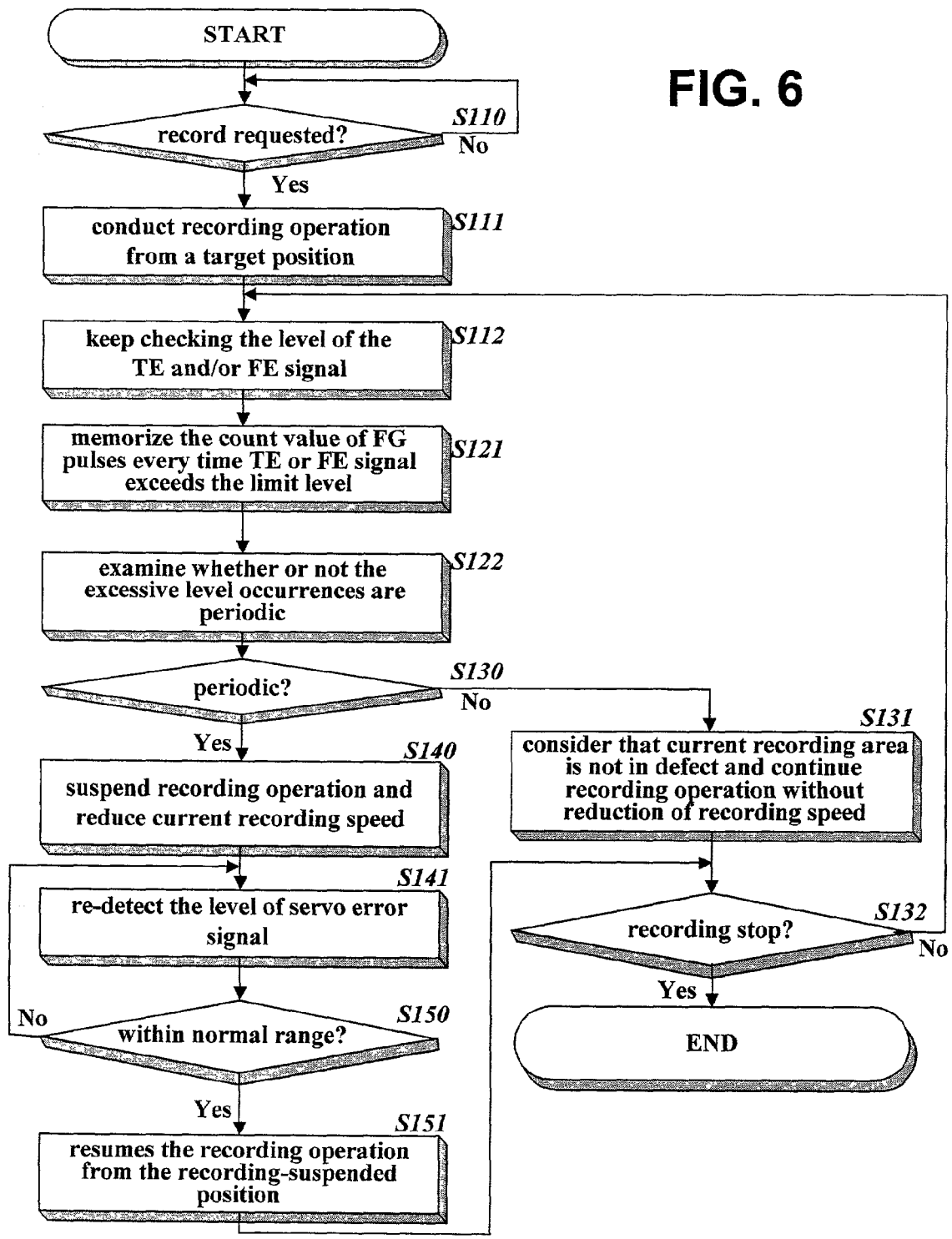
FIG. 6 is a flow chart of another embodiment of a defect area detecting method of the present invention.

FIG. 6 is a flow chart of another embodiment of a defect area detecting method of the present invention. The procedure of FIG. 6 conducted by the disk drive of FIG. 1 is explained below in detail.

Similarly to the previous embodiment, the microcomputer 80 conducts recording operation (S110,S111), detects continuously levels of the servo error signal, namely, TE and FE signal during the recording (S112), and checks whether the level of either of the TE and the FE signal exceeds a limit level (S120), which may be set differently for TE and FE, respectively.

If the TE or FE signal becomes above the limit level, the microcomputer 80 examines whether or not occurrences of the excessive level are periodic (S122). For this examination, the microcomputer 80 memorizes the count value of the FG counter 71 every time the TE and/or the FE signal exceeds the limit (S121). If each increasing step of the memorized values is uniform, e.g., constant 12 corresponding to one revolution of the writable disk 10, the microcomputer 80 considers that the occurrences of excessive level are periodic. If not uniform (S130), then the microcomputer 80 considers that the occurrences of excessive level are caused from not defect of a recording area but a mechanical shock etc., so that it continues recording operation without reduction of recording speed (S131).

Figure 7:
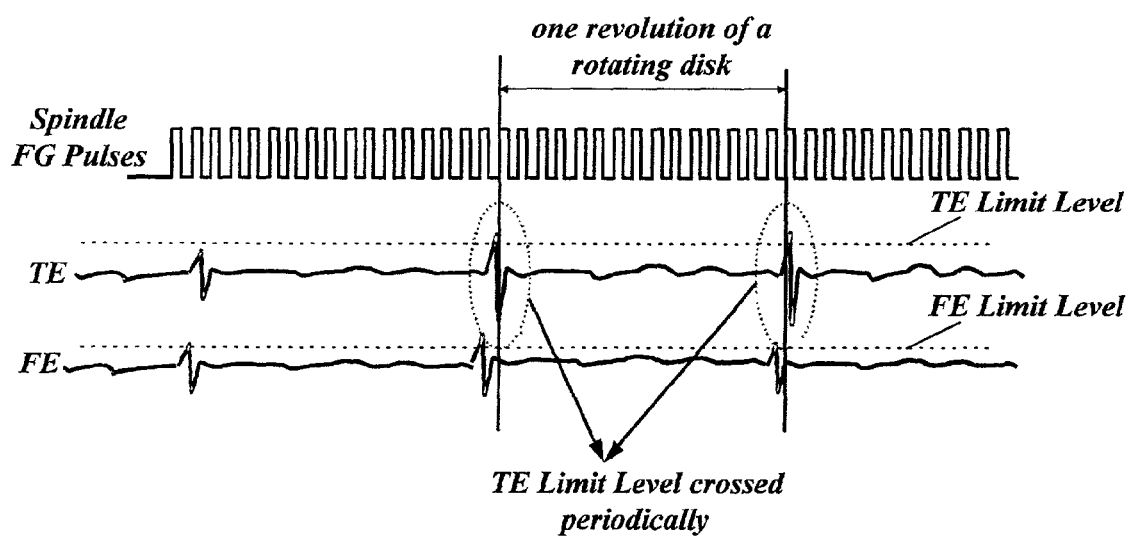
FIG. 7 shows another illustrative abnormal state of a tracking and a focusing error signal.

If it is confirmed that the level of the TE signal exceeds the limit periodically every revolution of the writable disk 10 as shown illustratively in FIG. 7, the microcomputer 80 regards that a current recording area is in defect and suspends recording operation temporarily. Next, the microcomputer 80 reduces current recording speed adequately through the servo unit 70 and the driving unit 71 (S140) and re-detects the servo error signal (S141) to know whether the servo error signal reverts to normal range (S150). If the servo error signal is maintained within the normal range for a while the microcomputer 80 judges that current position has escaped the defect area, so that it resumes the recording operation (S151).

The above-explained method of detecting a defect area of a writable disk without any mistake in accordance with the present invention ensures exact detection of a defect area, whereby unnecessary speed reduction can be eliminated and successful data writing can be also guaranteed even in a defect area.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of detecting a defect area of a writable disk, comprising the steps of:
    (a) detecting a level of a servo error signal produced during a recording operation;
    (b) checking whether the servo error signal is abnormal based on the detected level;
    (c) detecting a periodic signal produced during the recording operation;
    (d) determining whether a recording area is defective based on the checked result and the detected periodic signal; and
    (e) reducing a current recording speed if it is determined that the recording area is defective and continuing the current recording speed if the periodic signal is decoded successfully even if the servo error signal is abnormal.

2. The method of claim 1, wherein the periodic signal represents periodicity of the abnormal state occurrences of the servo error signal.

3. The method of claim 1, further comprising detecting a signal modulated into a wobble track of the writable disk and checking whether the detected signal is normal or not.

4. The method of claim 3, further comprising judging normality of the detected signal based on whether the signal modulated into the wobble track is detected successfully or not.

5. The method of claim 1, wherein the servo error signal is one of a tracking error and a focusing error signal.

6. A method of detecting a defect area of a writable disk, comprising the steps of:
    (a) detecting a servo error signal and a signal modulated in a wobble track, the two signals being produced during data recording along the wobble track;
    (b) checking whether an abnormal state of the detected servo error signal lasts and whether the modulated signal is detected successfully;
    (c) determining whether a recording area is defective based on the checked result; and
    (d) reducing a current recording speed if it is determined that the recording area is defective and continuing the current recording speed if the signal modulated in the wobble track is decoded successfully, even if the servo error signal is abnormal.

7. The method of claim 6, wherein the servo error signal is a tracking error signal.

8. A method of detecting a defect area of a writable disk, comprising the steps of:
    (a) detecting a level of a servo error signal produced during a recording operation;
    (b) checking whether the servo error signal is abnormal based on the detected level;
    (c) determining whether an abnormal state of the servo error signal is instantaneous or has an effect on a plurality of physical tracks if the servo error signal is in abnormal state;
    (d) determining whether a recording area is defective based on the determination result of said step (c); and
    (e) reducing a current recording speed if it is determined that the recording area is defective and continuing the current recording speed if the abnormal state of the servo error signal is instantaneous, even if the servo error signal is abnormal.

9. The method of claim 8, wherein said step (c) determines that the abnormal state has an effect on a plurality of physical tracks if the abnormal state occurs periodically.

10. The method of claim 9, wherein said step (c) determines that the abnormal state has an effect on a plurality of physical tracks if the abnormal state occurs at a period which is corresponding to one revolution of the writable disk.

* * * * *